United States Patent

Coppel

[15] 3,677,382
[45] July 18, 1972

[54] FLEXIBLE BEARING FOR A CONVEYOR ROLLER CAPABLE OF BEING INCORPORATED IN A ROLLING PLANE

[72] Inventor: Georges Coppel, St. Ouen, France
[73] Assignee: "Constructions Mills-K", Saint-Ouen, France
[22] Filed: Feb. 9, 1971
[21] Appl. No.: 113,873

[30] Foreign Application Priority Data
Feb. 17, 1970  France.................................7005707

[52] U.S. Cl..............................................193/35 B, 308/20
[51] Int. Cl.........................................................B65g 13/00
[58] Field of Search..................308/20, 26; 193/35 B, 35 SS

[56] References Cited

UNITED STATES PATENTS
1,550,614  8/1925  Hunt.........................................308/20
2,990,929  7/1961  Attwood..............................308/20 X FOREIGN PATENTS OR APPLICATIONS
777,307  6/1957  Great Britain........................193/35 B Primary Examiner—Richard E. Aegerter
Assistant Examiner—H. S. Lane
Attorney—William A. Drucker

[57] ABSTRACT

A conveyor roller bearing which supports the center of the roller through a flexible structure. The latter comprises two branches of a spring wire which have two lateral coaxial portions inserted in the roller on each side of the latter. The branches have lower end portions anchored in the bottom of a fork-shaped support. The branches are arcuate and have a concavity facing in the direction of the destination of the objects which pass over the roller. Oblique lateral abutments on the lateral walls of the support enable an additional force of compression to be applied to the arcuate branches.

8 Claims, 5 Drawing Figures

Patented July 18, 1972
3,677,382
2 Sheets-Sheet 2
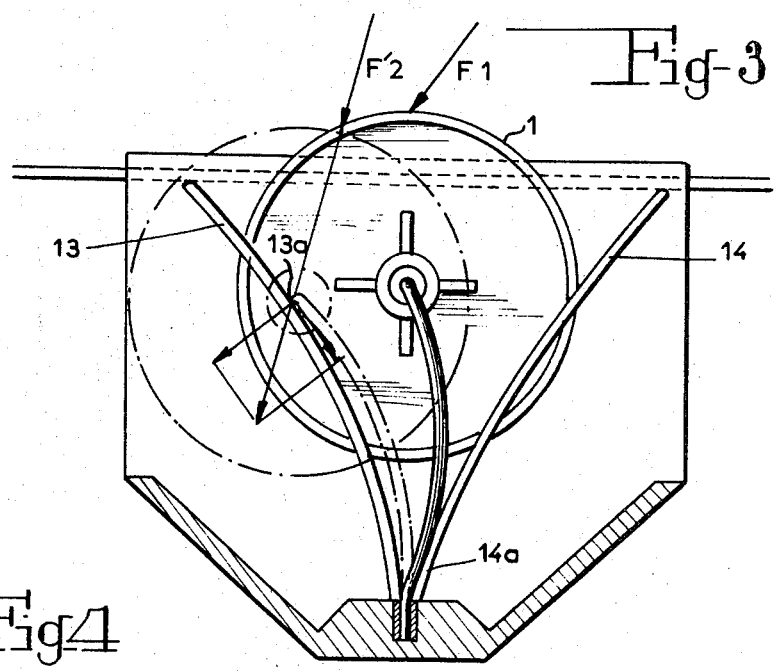
Fig-3
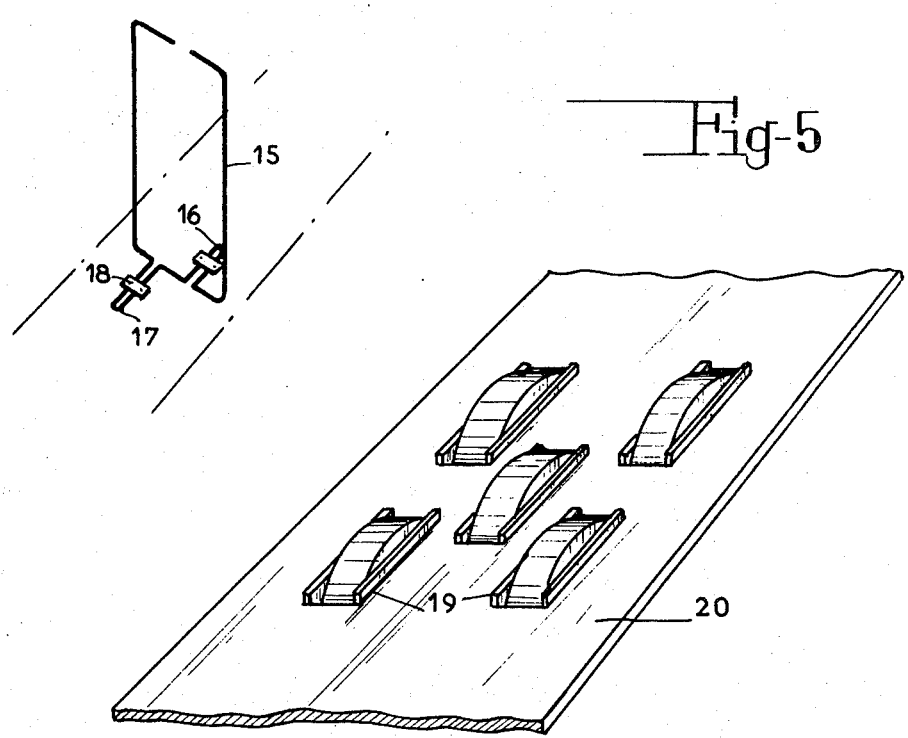
Fig-4
Fig-5

FLEXIBLE BEARING FOR A CONVEYOR ROLLER CAPABLE OF BEING INCORPORATED IN A ROLLING PLANE

The invention relates to a bearing for a roller which is employed in a handling rolling plane or runway and may be of light construction and capable of withstanding without damage the loads and blows of objects such as packing-cases which run down this rolling plane.

In conveyors having rollers there are usually very high accidental overloads on certain rollers. These overloads are due to:

irregularities in the bottom of the packages which, in the case of a particularly unfavorable distribution of the hypostatic loads, may concentrate the entire load of a package on a single roller instead of over a plurality thereof;

a dynamic overload due to the velocity of the package, which overload may be particularly high in the case of an irregularity in the bottom of the packages;

irreversible loading (this momentarily doubles the forces due to the load) or sudden loading (there is then created a kinetic energy which results in forces which are the greater as the possibilities of deflection of the supports are less).

To accommodate these overloads, the rollers are normally made oversize. One of the objects of the present invention is to distribute the loads in an improved manner and, in the event of an excessive overload (which might reach the allowable limit for a roller), to completely stop the system with no fracture or permanent deformation of any of its elements.

Various devices flexibly supporting or suspending the spindles of handling rollers are known. For example, their spindles have been provided at each end with rubber pads which bear in a longitudinal recess formed in walls supporting the rollers. However, if a certain flexibility is to be achieved, the rubber must not be too hard and, in the case of shocks resulting in high dynamic forces, the pads are liable to be completely crushed. In order to prevent the rollers from retracting to the level of the rolling plane, there must be provided an abutment or stop for the spindle in the inward direction of movement and, if this stop is encountered, there is no longer any resilience. It is also possible to dispose the ends of the spindle on lateral coil springs or conical springs whose deflection diminishes with the load, but this is costly and requires special arrangements of the flanges of the L-section member constituting the runway.

The invention has for purpose to remedy these various drawbacks and provides a device which requires no special arrangement of the U-shaped support walls in which the rollers are mounted.

This support can therefore be designed as a mounting unit, a great number of which can be disposed on a rolling surface in accordance with variable arrangements.

According to the invention, the roller is maintained on each side of its center of rotation by two end portions of a spring wire, said wire being bent into two lateral branches extending toward the bottom of a support constituting a fork for the roller, and said branches being anchored in said bottom in such manner as to be subjected to bending and/or torsional stress in operation.

According to another feature of the invention, the lateral branches are curved with respect to the transverse plane of the support and have a concavity facing the side corresponding to the destination of the objects passing over the roller. Advantageously, the support is a cup of plastics material whose upper edges are capable of clipping into openings in a sheet of metal constituting a runway. The cup can comprise on its inner walls ribs constituting ramps having an oblique direction with respect to the branch of the spring wire so that when the ramp is encountered by the branch of the wire after a given deflection, the ramp transmits a compression force to the arched branch.

The various features of the invention will be apparent from the following description of one embodiment of the invention with reference to the accompanying drawings in which:

FIG. 3 is a longitudinal sectional view of the device showing the oblique lateral ribs;

FIG. 4 is a diagrammatic perspective view of a spring in one piece, and,

FIG. 5 is a perspective view of a rolling plane having a plurality of rollers arranged in staggered relation.

Figure 2:
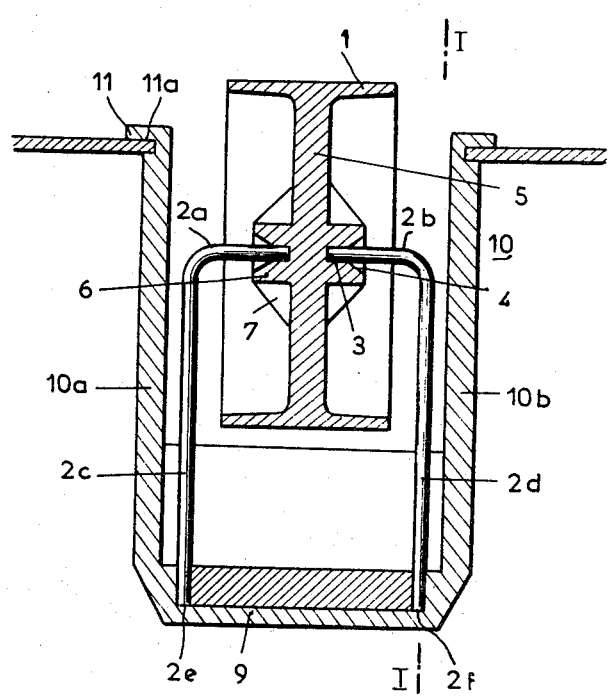
FIG. 2 is a cross sectional view taken along line II—II of FIG. 1.

In the embodiment shown in FIG. 2, a roller 1 whose web 5 is moulded in one piece with the center portion comprising the hubs 6 and reinforcements 7, has in its center two opposed blind apertures. The latter receive end portions 3 of two spring branches 2. The branches comprise a portion $2a$—$2b$, in the extension of the axis of the roller, and they are bent downwardly in the form of two branch portions $2c$—$2d$ whose lower portions $2e$-$2f$ may be welded to metal plates 8 moulded in the fork which is composed of plastics material and is generally designated by the reference numeral 10. For this purpose, the bottom 9 of the fork has an extra thick portion $9a$. The vertical walls $10a$, $10b$ of the fork terminate in flanges 11 having outer recesses $11a$, which are engageable on the edges of a plate.

Figure 1:
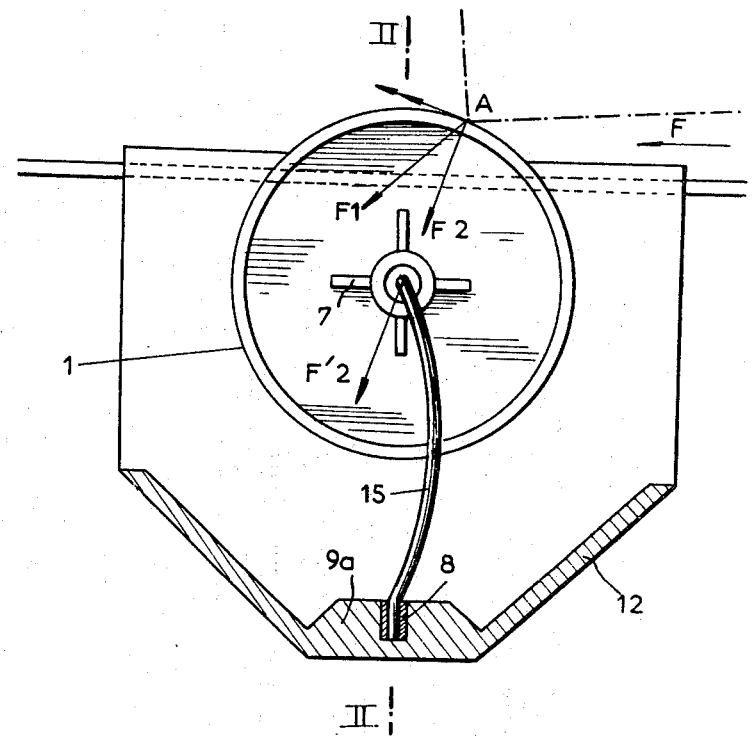
FIG. 1 is a longitudinal sectional view taken along line I—I of FIG. 2.

As can be seen in FIG. 1, the fork 10 is somewhat in the form of a cup open in the front part and closed at the rear, while its bottom is provided with an upwardly flared portion 12. This shape permits an easy insertion of the cup in openings in a plate, such as that shown in FIG. 5 which shows by way of example a staggered arrangement of opening 19 in plate 20.

There is shown in dot-dash line in FIG. 1 the contour of a packing-case which moves in the direction of arrow F and has a corner which encounters the roller and exerts thereon a dynamic force F1. The component on the axis of the roller is therefore F′2 and it can be seen that if the spring branch $2e$ and $2d$ is given a curved shape 15 whose concavity faces in the direction of arrow F′2, the resilience of the branch is improved. The spring branch bends in its foot or lower end portion $2e$ or $2f$ at the same time as it bends throughout the length of the branch. Further, as the angle of deflection is proportional to the force applied owing to the arrangement of the branch, the roller is pressed in or retracts to an extent which is proportional only to the cosine of the angle of deflection.

When the load on the roller reaches a given value, the deflection becomes so great that the roller retracts under the rolling plane or runway and the load then bears on a support which no longer permits its movement. If the roller retracts because the load travels at an excessive velocity, this constitutes a momentary deflection, since the load stops and the roller resumes its position.

If the excess load is due to the suddenness at which the packages are placed in position, the rollers are first caused to retract and then resume their position almost immediately (as soon as the system has resumed its static equilibrium) and the package can then start to move. On the other hand, if the rollers are made to retract because the load is greater than that for which the system was designed, the rollers remain retracted and the conveyor ceases to operate. This indicates to the user that a loading error has just been made.

If the shocks to be withstood are very great there may be disposed on the inner walls of the fork a rib 13 which is encountered at $13a$ by the upper end of the spring (see FIG. 3). This affords a relative abutment, since an axial force in the direction of arrow F′2 still gives a component which tends to bend the branch of the spring in the form of a bow.

It is advantageous to provide two symmetrical ribs 13, 14 arranged in the form of a V which facilitates the fabrication of the moulded support with insertion of the spring branches. When the rib is tangent to the curved branch at 14a it may improve the performance of the roller at the moment of the initial impact of an object thereon.

According to a modification of the invention, it is possible to make the spring in one piece, such as that shown in FIG. 4. The branch portions 18 are connected to a median branch which is deformed in the form of two loop portions 16, 17. The latter may be incorporated in the moulded base of the support or clipped in tabs 21 in the case of a metal support. This form of the spring in one piece is advantageous, since in this case the foot portion of the branch undergoes torsional stress which avoids a shearing of this portion.

It must be understood that the invention can be applied to any runway or rolling plane device and is not intended to be limited to the embodiment described. In particular, the support can be a metal channel and have a plurality of rollers mounted therein.

In this case, the abutment ribs may be obtained by deformed tab portions in the walls. The spring branches may be anchored in the base in various ways.

I claim:

1. A conveyor roller bearing comprising a U-shaped support having a bottom portion, a spring wire for supporting the roller, said wire comprising two transverse end portions coaxial with the axis of rotation of the roller and adapted to support the roller on each side of the roller, two lateral branches downwardly extending from said end portions to said bottom portion of said support, said branches being anchored in said bottom portion in such manner as to be subjected to bending and/or torsional stress in bearing operation.

2. A bearing as claimed in claim 1, wherein said lateral branches are curved with respect to a transverse plane of said support and have a concavity facing in the direction of the destination of the objects which engage the roller.

3. A bearing as claimed in claim 1, wherein said support is a fork composed of plastics material and comprising a U-shaped bottom portion having a portion of extra thickness for anchoring said lower end portions of said spring wire.

4. A bearing as claimed in claim 3, wherein said lower end portions of said spring wire are welded to metal strips embedded in the molded material of said support.

5. A bearing as claimed in claim 3, wherein said spring wire is in one piece and has the general shape of a stirrup having a base portion which includes two loop portions extending in opposite directions.

6. A bearing as claimed in claim 2, wherein said support comprises lateral walls having inner projecting portions constituting oblique ramps which are positioned to be encountered by said branches of said spring wire after an initial deflection of said branches.

7. A bearing as claimed in claim 6, wherein said projecting portions are ribs arranged on the corresponding lateral wall symmetrically about a vertical plane and in the form of a V and support said branches of the spring wire adjacent said lower end portions.

8. A bearing as claimed in claim 2, said support being a fork composed of plastics material and comprising a U-shaped bottom portion having a portion of extra-thickness for anchoring said lower end portions of said spring wire, said bottom portion having inclined faces and said fork comprising flanges extending from lateral walls of said fork in which walls are provided outer recesses for easy insertion in, and clipping on, an apertured plate.

* * * * *